(No Model.)

R. J. NORTHAM.
SURVEYOR'S MONUMENT.

No. 564,025.　　　　　　　　Patented July 14, 1896.

Witnesses
Jerry Kingman.
Alfred T. Townsend.

Inventor
Robert J. Northam
by Hazard & Townsend
his attys.

UNITED STATES PATENT OFFICE.

ROBERT J. NORTHAM, OF LA MIRADA, CALIFORNIA.

SURVEYOR'S MONUMENT.

SPECIFICATION forming part of Letters Patent No. 564,025, dated July 14, 1896.

Application filed April 23, 1896. Serial No. 588,740. (No model.)

*To all whom it may concern:*

Be it known that I, ROBERT J. NORTHAM, a citizen of the United States, residing at La Mirada, in the county of Los Angeles and State of California, have invented a new and useful Surveyor's Monument, of which the following is a specification.

An object of my invention is to provide superior means for indicating the corners and other boundary points of a surveyed tract of land.

It is an object of my invention to provide very simple and convenient means for indicating on a stake or other monument the exact location of such stake or monument on the ground surveyed. It has been customary in government surveys for the surveyor to mark upon the stake letters or other characters indicating the various subdivisions which border upon the point marked by the stake or monument; but this involves much time and labor, and in the case of small subdivisions and of irregular tracts this loss of time and labor is increased.

An object of my invention is to enable the marking to be done with great ease and without loss of time.

With my invention it becomes very easy to mark the stake in a moment so that its location will be known at a glance.

My invention comprises a surveyor's stake or other monument provided with a plat and a suitable marker located on said plat to indicate the location of such stake or monument on the surveyed tract of land.

The accompanying drawings illustrate my invention.

Figure 1:
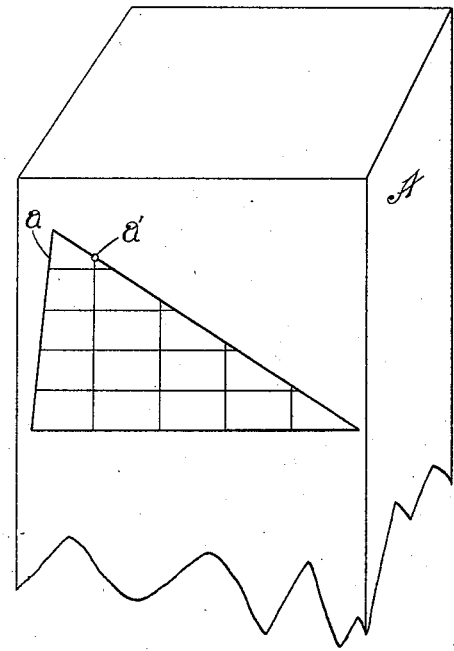
Figure 3:
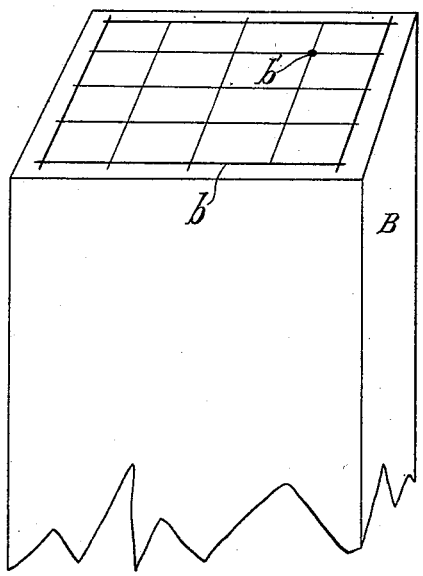
Figure 2:
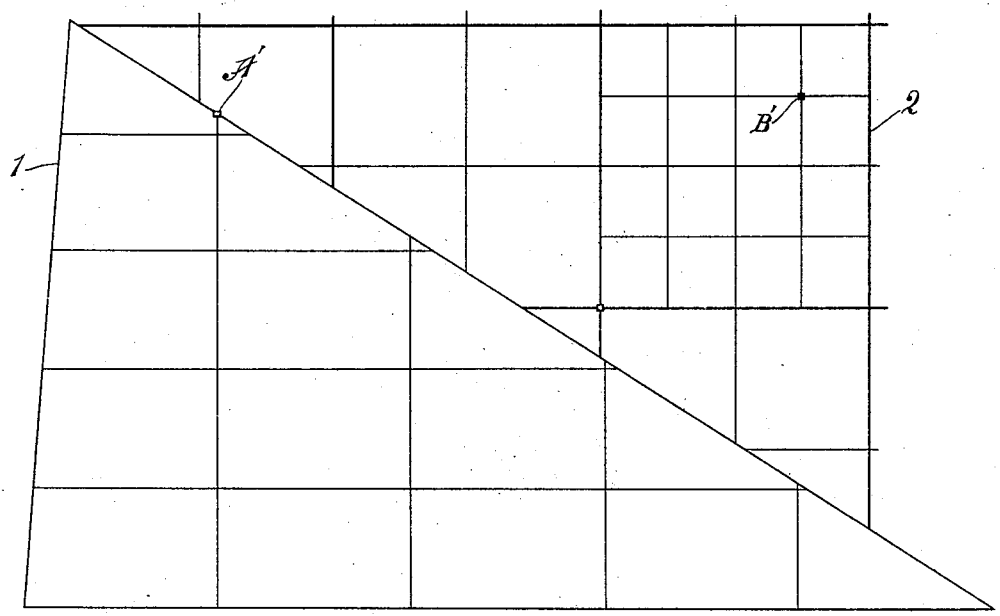

Figure 1 is a fragmental view of a stake or other monument provided with a plot, with a marker located on said plot to indicate the location of the monument to mark the point or corner in the rancho survey, indicated at A' on Fig. 2. Fig. 2 represents a surveyed tract of land marked with suitable monuments and comprising both government township and rancho surveys. Fig. 3 shows a fragment of another stake or monument provided with a marker located on the plot to indicate the location of this monument-stake at B', on the government survey of the tract of land represented in Fig. 2.

A indicates a post, stake, or other monument on which is a plat $a$ of the tract surveyed or to be surveyed. $a'$ indicates a marker on the said plat, which marker is located at a point on the plat corresponding to the location, as at A' in Fig. 2, the monument occupies or is to occupy on the surveyed tract of land, the boundaries of which it is designed to mark.

In Fig. 3, B indicates a suitable stake, post, or other monument provided with a plat $b$ of a section of the government survey, and with a marker $b'$ to indicate the location, as at B', of the stake B on the surveyed tract of land.

The marker may consist of a nail, tack, screw, pin, or any other suitable device driven into the stake or other monument, as at $a'$, Fig. 1, or it may consist of a hole punched, burned, or bored into the monument, as at $b'$, Fig. 3. These markers can be applied to the stakes or other monuments either on the field at the time of or subsequent to setting the stakes or they may be applied before the stakes are taken to the field, and the same is true of the plat; but it will probably be usually found preferable to apply the plat to the stakes before they are taken to the field, and to apply the markers to the stakes when in the field.

In the case of wooden stakes or posts the plat may be printed thereon with a hot iron arranged to burn the plat into the wood, or it may be printed, painted, or stenciled on or burned, stamped, or cut into, or otherwise marked onto the stake or other monument in any desired way, or by any desired means adapted for marking the material of which the monument is made. The plat may be placed on the top of the monument or on any of the other faces thereof preferred. In Fig. 1 the rancho plat $a$ is shown on the side of the stake, and in setting such stake at A' the marked face of the stake would be turned toward the rancho.

When the monument is set and the mark has been properly located on the plat thereon, a glance at the plat will instantly show any one the exact location of the stake.

The plat may or may not bear on its face any suitable letters or figures, such as "S5," "T1S," "R5W," (not shown in the drawings,)

to indicate the location of the tract of land, to which the survey pertains. The marker on the stake shown in Fig. 3 indicates that the stake stands in the center of the northwest quarter of the section.

It is to be understood that the invention is applicable to any tract, whether in regular rectangles or of any other form of subdivision. In each instance the plat marked on the monument will correspond to the map of the tract surveyed, sufficiently to enable the location of the stake to be determined; but it is to be understood that the plat need not be perfectly accurate in its proportions in order to accomplish the desired result.

In practice a stake or monument will be placed at each corner or point on the tract to be marked, and will be marked with a marker located on the plat, so as to indicate the location of the stake on the tract.

Now, having described my invention, what I claim as new, and desire to secure by Letters Patent, is—

1. A surveyor's stake or other monument provided with a plat; and a suitable marker located on said plat to indicate the location of such stake or monument on the surveyed tract of land.

2. A surveyor's stake or other monument having marked thereon the plat of the ground to be surveyed, and said plat so arranged on said stake or monument that the location of the stake on the ground can be indicated by a tack or other mark placed on the plat, which is marked on the stake at the point corresponding to the point where the stake is placed in the ground.

ROBERT J. NORTHAM.

Witnesses:
JAMES R. TOWNSEND,
ALFRED I. TOWNSEND.